(12) United States Patent
Kostrzewski et al.

(10) Patent No.: US 7,899,114 B2
(45) Date of Patent: Mar. 1, 2011

(54) SYSTEM AND METHOD FOR MAXIMIZING VIDEO RF WIRELESS TRANSMISSION PERFORMANCE

(75) Inventors: Andrew Kostrzewski, Garden Grove, CA (US); Tomasz Jannson, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 1500 days.

(21) Appl. No.: 11/285,591

(22) Filed: Nov. 21, 2005

(65) Prior Publication Data

US 2007/0116118 A1   May 24, 2007

(51) Int. Cl.
*H04N 5/262* (2006.01)
(52) U.S. Cl. ............................. 375/240.01; 375/240.27
(58) Field of Classification Search ......... 382/232–251, 382/309; 375/240.01–240.29; 348/14.01–14.16, 348/470, 384.1–425.4; 370/469, 286, 252, 370/333, 310; 455/521, 431
See application file for complete search history.

(56) References Cited

U.S. PATENT DOCUMENTS

| 6,137,912 | A | 10/2000 | Kostrzewski et al. | |
| 6,167,155 | A | 12/2000 | Kostrzewski et al. | |
| 6,339,450 | B1 * | 1/2002 | Chang et al. | 348/470 |
| 6,487,312 | B2 * | 11/2002 | Kostrzewski et al. | 382/232 |
| 6,996,176 | B1 * | 2/2006 | Chang et al. | 375/240.16 |
| 7,558,428 | B2 * | 7/2009 | Shen et al. | 382/236 |
| 7,688,750 | B2 * | 3/2010 | Chen et al. | 370/252 |
| 7,813,570 | B2 * | 10/2010 | Shen et al. | 382/236 |
| 2007/0002949 | A1 * | 1/2007 | Cheung et al. | 375/240.16 |

OTHER PUBLICATIONS

Jannson, T., Kim, D.H., Kostrzewski, A.A. And Ternovskiy, I.V., "Soft Computing and Soft Communication (SC2) for Synchronized Data (Invited Paper)." SPIE Proc. (1999), vol. 3812, pp. 55-67.

(Continued)

*Primary Examiner*—Sherali Ishrat
(74) *Attorney, Agent, or Firm*—Sheppard Mullin Richter & Hampton LLP

(57) ABSTRACT

A system and method that will improve QoS (Quality of Service) of wireless video transmission systems. This is done by "in-fly" monitoring of BER by periodically transmitting "test images", which images are known to the RF-receiver (Rx). BER can be automatically computed, within a related BIT (Built-in-Test) procedure that is also the subject of this invention. This allows predictions of a proper increasing, or decreasing of bandwidth OVH-level, in order to compensate for a BER-change. BER computation is facilitated by distinguishing video frames based on whether they depict new spatial events or related temporal events. Another subject of this invention is a motion-based pre-ATR method that is an introduction to common ATR, or pattern recognition methods. Yet another subject of this invention is a process of implanting error correcting bits into a payload, in the form of imperceptible watermarks. Still other aspects hereof, relate to such networks as: MAN, WAN, Tactical Internet, and others, to provide extra protection of headers, by implanting them into payloads, with a high level of Bit-Selective-Error Correction. Also included herein is a novel compression concept for still images which applies the spatial or meaningful frame technique to still imagery in a wavelet compression format.

7 Claims, 7 Drawing Sheets

OTHER PUBLICATIONS

Jannson, T., Kostrzewski, A.A., Shnitser, P., Kim, D., and Ternovskiy, I.V., "Soft Computing, Advanced Video/Imager Processing and Communications (Invited Paper)." SPIE, Proc. (2000), vol. 4120, pp. 120-133.

Jannson, T., "Soft Computing and Small System Integration." SPIE Proc. (2004), pp. 5558.

Jannson, T. and Kostrzewski, A.A., "Small Communication Platforms, PCMCIA-Packaging and Soft Computing for UGV Applications." SPIE Proc. (2000). vol. 4024, pp. 326-340.

Kostrzewski, A.A., Jannson, T.P., and Kupiec, S. "Soft Computing and Wireless Communiation." SPIE Proc. (2001), vol. 4479, pp. 70-74.

Jannson, T.P., Kostrzewski, A.A., Kang, D.S., Son, B., Lee, C., Kim, J.H., Kolesnikov, K. "Soft Computing and Soft Communication (SC2) Hybrid RF-Wireless Communication Platforms and Interface for BLOS and Sensor WLAN Applications." SPIE Proc. (2001), vol. 4479, pp. 75-82.

Jannson, T.P., Kostrzewski, A.A., Forrester, Thomas, Kupiec, S.A., and DeBacker, T.A., "Aerogels, SC2 Compression, and Gbytes Flash Memories." SPIE Proc. (2001), vol. 4479, pp. 96-104.

Jannson, T., Kostrzewski, A.A., Ternovskiy, I.V., "Super-Fast Supercomputer Class Onboard Processing for Visual Sensor NMD Applications." SPIE Proc. (2001). vol. 4367, pp. 513.

Jannson, T., Kostrzewski, A., Ro, S.N., Forrester, T., and Hester, T., "Soft Computing Techniques in Network Packet Video." SPIE Proc. (2003), vol. 5200-27.

Jannson, T., Kostrzewski, A.A., Ternovskiy, I.V., "Nearly-Autonomous Mode of Operation and Navigation in UGV's." SPIE Proc. (2001), vol. 4364, pp. 7-11.

Jannson, T., Kostrzewski, A., Wang, W., and Hester, T., "Soft Computing and Minimization/Optimization of Video/Imager Redundancy." SPIE Proc. (2003), vol. 4200, pp. 28.

Jannson, T.P., Kostrzewski, A.A., Sun, B.K., Wang, W., Kolesnikov, K., Kupiec, S.A., "Soft Computing Visual Communication, Spatial/Temporal Events, and Optimum Bandwidth Utilization." SPIE Proc. (2002), vol. 4787, pp. 137-146.

Born, M., Wolf, E., "Principles of Optics." Cambridge University Press, 7th Edition, pp. 561.

Jannson, T., Kostrzewski, A.A., Lee, K., Hester, T., Forrester, T., Savant, G.D., "Soft Computing and Small System Integration." SPIE Proc. (2004), vol. 5558, pp. 47-56.

Osugi, Y., Honda, A., Tange, S., Toyoda, S., "The Development of New X-Ray Still Image Detector XTV-PROM." SPIE (1992), vol. 1736, pp. 2-9.

Berzins, G.J., Graser, M., " Response of a Bi12Sio20 Pckels Readout Optical Modulator to X Rays." Ippl Phys. Lett. (Apr. 15, 1979), pp. 500-502.

Stokes, G., Stupin, D., Elliott, N., "Pockels Readout Optical Modulator: An X-Ray Imaging Detector That Maintains Good Efficiency Over a Broad Energy Range." Rev. Sci. Instrum. (Nov. 1985), vol. 56, pp. 2173-2175.

http://www.jmcgowan.com/avialgo.html.

http://www.cse.wustl.edu/~jain/cis788-99/ftp/compression/.

http://www.techonline.com/community/ed_resource/feature_article/20026.

* cited by examiner

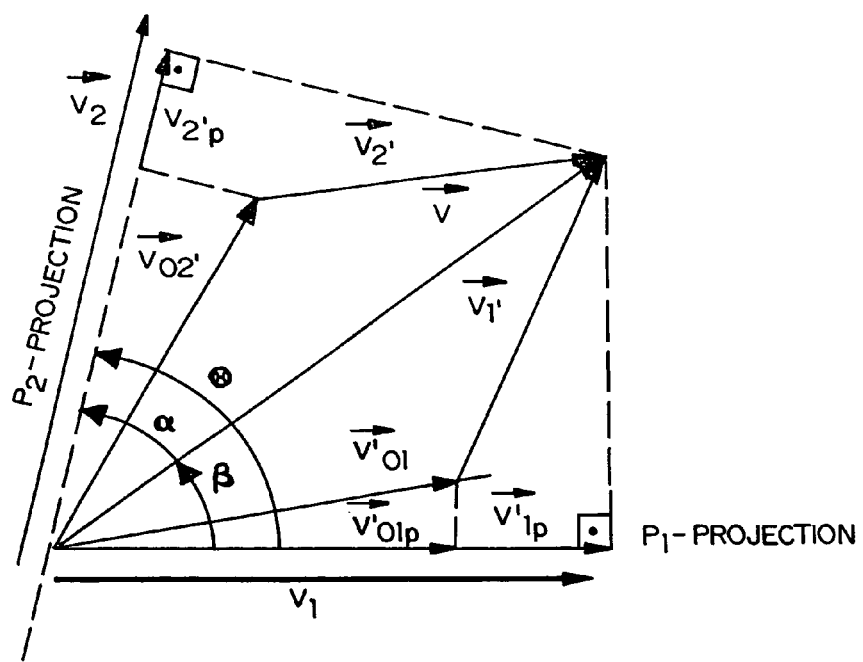
FIG. 8A
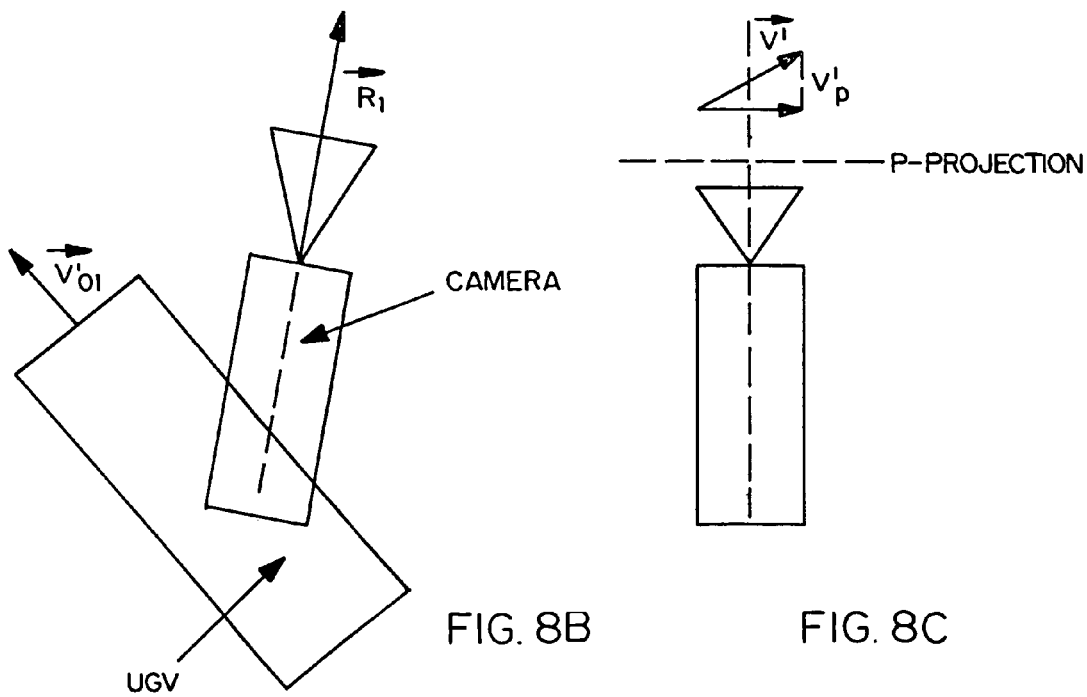
FIG. 8B
FIG. 8C

SYSTEM AND METHOD FOR MAXIMIZING VIDEO RF WIRELESS TRANSMISSION PERFORMANCE

BACKGROUND OF THE INVENTION

1. Field of the Invention

The present invention relates generally to the application of a video compression concept of reference frames and daughter frames to optimizing transmission and/or storage of video images and to other applications of highly parallel processing of image-related data.

2. Background Art

One of the most critical techniques influencing video RF performance is lossy compression of video imagery data, or payload, under conditions of a noisy RF-wireless communication channel. Such a channel is usually defined by external network protocols that operate under certain prioritization, factors that define available bandwidth, $B_A$, for the specific channel, which, in general, changes in time. Also, such bandwidth can be defined by available RF Tx/Rx-equipment. Sometimes, only part of $B_A$ is used, denoted as Bu, or used bandwidth; giving in general:

$$B_u \leq B_A$$

Typically, as below, we assume the equality sign in this equation, i.e., $B_u = B_A$, without loss of generality.

Typically, the video Compression Ratio, or (CR) is a high number; e.g., (CR)>100:1, but it can also be (CR)>1000:1, or even: (CR)>4000:1 (see Reference Nos. 1-2). This is, because, human visual perception is very tolerant of motion errors. In contrast, for static, or still imagery, the relevant lossy compression ratio is much lower, up to 20:1, for almost lossless compression, such as perceptually lossless wavelet compression for medical imagery. This method is an enhanced version of Malat's wavelet method, heavily supported by "supercomputer-in-a-box" image processing hardware, called PUMA (Processing and Ultra-Memory Access), as in Reference Nos. 3-5. In general, PUMA is hardware adopted from motion-error analysis, or graphic-IC hardware (see Reference Nos. 3-6). Such hardware is FPGA, or ASIC-type, and is in the form of a highly-parallel chipset, such as 256-processors, in parallel, with a low-level voltage supply. Such very compact (2"×3") chipset performs a high-speed operation, but only of a specific type, such as simple algebraic operations: subtraction, addition, square, etc. These simple algebraic operations, however, are sometimes sufficient for a more complex function, such as image compression, or pattern recognition, called ATR in the military (Automatic Target Recognition). For example, if we base our pattern recognition on template matching, then the PUMA will be ideally suited to such an operation.

The above background is helpful to understand the present invention, in the context of so-called soft computing. There are a number of soft computing meanings (see Reference No. 14), but we choose here the following definition: Soft Computing and Soft Communication, or SC2, are techniques, based on statistical still/video imagery analysis in real-time, which means that many identical operations must be performed at the same time, or highly parallel; see Reference Nos. 1-8.

Two basic video compression techniques are of major interest for the purpose of this invention: MPEG and wavelet. Both are known in the literature. MPEG (Moving Pictures Experts Group) has defined a motion-picture compression standard, in the form of MPEG-1, MPEG-2, MPEG-4, and MPEG-7, to mention the most successful standard options.

All of them, but especially MPEG-1, and its more standardized version MPEG-2; are based on the concept of the so-called I-frame which is a form of reference frame which is used as a base to generate related frames, sometimes called daughter frames. In the case of MPEG-1, there are specifically fourteen (14) daughter frames, so a total cycle has 15 frames: one I-frame and 14 related frames, called here R-frames. The essence of MPEG compression is that it is not necessary to send full information about all frames, since they are essentially similar in short periods of time, such as 0.5 sec, or 500 msec, which is the total time of the MPEG-frame cycle of 15 frames, adjusted to the American standard of "full-motion," which is 30 frames per second, or 30 fps. Based on that is so-called VGA-video standard which assumes such image-formats as 640×480 pixels, or 740×480 pixels, or others, and RGB-colors which is 24 bits per pixel, or 24 bpp, and 8 bits per color. Therefore, the total VGA bandwidth is, for example, (640×480)×(24)×(30)=221 Megabits per second, or 221 Mbps, which is the payload bandwidth. In the wireless, or wired network cases, however, we also have bits other than payload bits, such as header bits, or redundant bits, necessary for bit-error-correction, such as Forward-Bit-Error Correction, or others. In the network case, such as ATM (Asynchronous Transfer Mode), or others, those bits are organized in the form of so-called streaming video, into packets. Each packet consists of payload and header. For example, for the ATM network we have a 53 byte packet with a 5 byte header (1 byte is equivalent to 8 bits).

The video payload bits can he heavily compressed; thus, reducing original, or raw bandwidth, $B_o$, by the (CR)-factor. For example, for a VGA-original (payload) bandwidth of 221 Mbps, and for a (CR)=1000:1, the compressed bandwidth, $B_o(CR)$=221 kbps.

The second type of compression considered here as important, is wavelet compression, typically applied for still imagery. Here, however, it can also be applied either as real-time video compression, or as I-frame compression.

The basic contribution of relevant prior art is found in two U.S. Pat. No. 6,167,155, and U.S. Pat. No. 6,137,912, both assigned to the assignee of this application. They present the concept of meaningful, or significant I-frame, called here M-frame, which is introduced whenever needed, in contrast to the conventional MPEG, where I-frames are introduced, periodically, in equal 0.5 sec-intervals. This patented concept introduces I-frames, called M-frames, at any time, whenever the motion error, defining the difference between an M-frame and a given daughter frame exceeds a predetermined threshold value. Such a meaningful, or significant M-scene defines, automatically, a cycle of daughter frames, following this specific M-frame, until a new significant M-frame is introduced. We call this cycle of daughter frames, "belonging" to the specific I-frame, an "M-scene," since, these daughter frames correspond to the single M-frame, because of their small difference from the mentioned M-frame. In a given moment, however, about 6 sec on average, some daughter frame will become sufficiently different from the M-frame, that it will become a new M-frame, defining the next M-scene, etc. Such a situation can happen in a movie when indeed "a new scene," occurs, or because something significantly new arrived in the video frame of a surveillance camera, such as a new moving object, or because a camera scan projected a new scene, or because of sudden motion of a camera. The reasons for changing a scene can be many, but we always have a new M-frame which is "a leader" of its following daughter frames. Their number is not always fourteen (14) as in the case of the conventional MPEG, but more or less than 14, and this number is dynamically changing. For slow motion, or for high elevation surveillance, where the objects on the ground seem to move more slowly, such M-scenes will be "longer," than for fast motion, or full motion situations, such as action movies, which, indeed, require high video rate, such as 30 fps, or even higher. Also, a new type of surveillance by low elevation UAVs (Unmanned Aerial Vehicles), will be a fast motion situation, where video scenes, or cycles, will be rather short. It seems logical that such motion-adopted MPEG compression, as defined in U.S. Pat. No. 6,167,155, naturally organizes streaming video frames, into cycles, or "scenes"; each with single higher-hierarchy "Meaningful" I-frame or (M-frame), and a some number-n, where n-integer, n=0, 1, 2, . . . , of lower-hierarchy daughter frames, that can be organized as MPEG-1 frames: $I_o$, $B_{oo}$, $B_{oo}'$, Po, $B_{O1}$, $B_{O1}'$, $P_1$, etc.; see Reference No. 1 for more details. Other organizations are also acceptable. More important is that we have a new hierarchy: "one vs. many." We can consider these special I-frames, or M-frames, as spatial events, and daughter frames as temporal events. Such distinction is justified by the fact that, by definition, "spatial events," or static/still images present a "frozen" situation, defined by such features as high resolution, and complex color, but also low motion, or no motion. In contrast, "temporal events" are characterized by high motion, and high color but low resolution. Therefore, in addition to continuous storage of streaming video as in typical surveillance camera systems, it would be convenient to provide extra storage of M-frames, by applying some higher quality compression techniques such as wavelet, for example. Such storage contains high quality M-frame images, including high-resolution images obtained from mega-pixel cameras, if available. Such extra images can be used later for advanced ATR.

SUMMARY OF THE INVENTION

Consider a digital video wireless network; a network of video cameras connected by wireless communication which can be either RF-wireless (radio-wireless), or IR-wireless (infrared-wireless), or hybrid. The network can be local, or LAN (local area network), or MAN, or even WAN (wide-area-network), and the network can be organized in OSI-layers, or other layers, defined by specific network protocols. The subject of this invention is a system and method, for maximizing video performance under specific wireless communication channel dynamic conditions, including such parameters as: available bandwidth, or $B_A$; raw video bandwidth, or $B_o$; compression ratio, (CR); bandwidth OVH (overhead); signal-to-noise-ratio (SNR); BER (bit-error-rate), PSNR (Peak-signal-to-noise-ratio); and others. A premise of this invention is that under worsening communication channel conditions; i.e., under increasing (BER), we should rather increase (OVH) to add more redundant bits, in order to effectively reduce (BER) down to acceptable video quality level (e.g., $10^{-5}$ from $10^{-3}$). This, in turn, requires increasing (CR)-value. This increasing compression ratio is rather counter-intuitive, but decreasing (CR)-value would not be a good idea; an even worse idea would be to transfer digital video into analog video mode. The above notion is based on a concept, called here: a hardened-image, or H-image concept. By "hardening of an image" we mean that the video image is made resilient to a harsh dynamic environment to avoid a "blackout," or "heavy pixeling," or other "image interruptions" that prevent continuous surveillance of a scene. In such situations, under worsening of communication channel conditions, essential for wireless communication, we would prefer "graceful degradation of an image" instead of its "abrupt breaking"; thus preserving a continuous (or, almost continuous) video communication.

One subject of this invention is a system and method that will provide sufficient QoS (Quality of Service) to satisfy the above requirements. This is done by "in-fly" monitoring of BER by periodic sending "test images" or "test data" by an RF-transmitter (Tx), which images or data are known to the RF-receiver (Rx). Thus, BER can be automatically computed, within a related BIT (Built-in-Test) procedure that is also the subject of this invention. This will, in turn, allow us to predict a proper increasing, or decreasing of bandwidth OVH-level, in order to compensate for this BER-change. This can be done either on the basis of a look-up-table, or by providing a relevant feedback loop. This will also define a new (CR)-value. Another subject of this invention is a novel motion-based ATR (Automatic Target Recognition), a kind of pre-ATR method that will be an introduction to common ATR, or pattern recognition methods. Yet another subject of this invention is a process of implanting the above test images or other data of special interest into a payload, in the form of imperceptible watermarks. Still other aspects hereof, relate to such networks as: MAN, WAN, Tactical Internet, and others, to provide extra protection of headers, by implanting them into payloads, with high Bit-Selective-Error Correction (BSEC)-level. Also included herein is a novel compression concept for still images which applies the technique of statistically improved compression to still imagery in a wavelet compression format.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 5A shows a vehicle with three sensors; A,B,C; FIG. 5B shows measurement of distance, r, from the road slope; and FIG. 5C shows a graph of r vs. d and for $d>d_o$, r-constant;

FIG. 6A shows a scenario leading to rollover; FIG. 6B shows a scenario applying preventive action; FIG. 6C shows a data reduction pattern for the scenario of FIG. 6A; FIG. 6D shows a data reduction pattern for the scenario of FIG. 6B;

FIGS. 8A, 8B and 8C are speed vector diagrams for the OTM sensors (1) and (2), monitoring moving target, including: FIG. 8A shows an overall vector diagram; FIG. 8B shows a vector diagram for single UGV; and FIG. 8C is an illustration of p-projection;

DETAILED DESCRIPTION OF PREFERRED EMBODIMENTS

Hardened-Image-Concept

In order to optimize video streams we need to discuss such video and RF-wireless quantities as: (CR), (BER), (BSEC), FHSS (Frequency-Hopping Spread Spectrum), and others, within a single system, such as that shown in FIG. 1.

Figure 1:
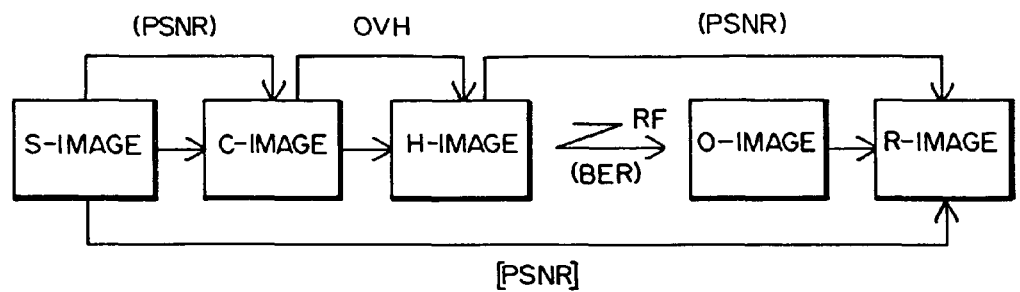
FIG. 1 is a block schematic of an RF-wireless video communication link, according to this invention.

In FIG. 1, a block schematic of RF-wireless video communication link is presented, including only one direction, or signal transmission for simplicity. This block schematic is more general than in literature and includes: source image, or S-Image; compressed image, or C-image; hardened image, or H-image; output image, or O-image; and reconstructed image, or R-image. It works for both video and still imagery, but here, we discuss, without loss of generality, only video imagery.

First, the original video bandwidth, $B_o$, is compressed into compressed video bandwidth, or $B_o/(CR)$. If extra-crypto is introduced, then, $B_o$-value should be replaced by $B_o(1+\delta)$, where $\delta$ is an extra bandwidth factor due to crypto. (As used herein, the term "crypto" means factors beyond our control including for example encryption). As a result, S-image is transformed into C-Image. The quality of this transformation is measured by so-called PSNR-coefficient, or Peak-Signal-to-Noise-Ratio, in the form:

$$(PSNR)[dB] = 10\log_{10}\frac{(CL)}{\sqrt{MSE}} \quad (1)$$

where CL—is a number of gray levels, and the Mean Square Error (MSE), is $$(MSE) = \frac{\sum_{i=1}^{n}\sum_{1=1}^{m}(fi,j - Fi,j)^2}{n \times m} \quad (2)$$

where Fi,j is pixel intensity level in a source image, and fi,j for compressed (and reconstructed) image, while n,m-numbers of pixels.

Second, the C-image is "hardened" resulting in the H-image by adding redundant bits for error-correction purposes; header bits, if needed, and other redundant payload bits, such as for BIT, and for ID (identification), and/or watermarking purposes. All these bits are included in bandwidth overhead, or OVH, so, total bandwidth, is $$B_u = \frac{B_o(I+\delta)}{(CR)} + (OVH) \quad (3)$$

Typically, $B_u \ll B_o$, so (CR)-value must be high. Also, $B_u$, or used bandwidth, is usually limited by network priority protocols, so, we have $$B_u \leq B_A \quad (4)$$

where $B_A$-available bandwidth, which can be a function of time, defined by external (or internal) to the LAN network protocols.

Third, the H-image is transmitted into RF-wireless channel, which is characterized by $$(SNR) = \frac{S}{N} \quad (5)$$

where S is the signal level and N is the noise level; usually given in [dB]. The (SNR) is a component of power budget relation (see Reference No. 12). The Bit-Error-Rate, or (BER) is the probability that an error arrives during RF signal transfer; and, typically, BER=$10^{-3}$ is too high to obtain a good quality video image, while BER=$10^{-5}$ is rather sufficient. The BER-parameter characterizes communication bit-errors in any type of binary data stream: video, audio, messages, etc. The bit error rate speed, in a number of errors, per second, is proportional to the bandwidth, B, in the form:

$$\frac{de}{dt} = (BER)(B) \quad (6)$$

where de/dt is in sec$^{-1}$. For example, for (BER)=$10^{-5}$, and (B)=100 Mbps, $$\frac{de}{dt} = 10^{-5} \times 10^8 = 10^3/\text{sec} \quad (7)$$

As a result, the H-image is transformed into the O-image.

Fourth, the O-image is transformed into the R-image, or reconstructed image. The reconstruction process is the digital computing process, that combines video decoding, error correction due to (BSEC), or Bit-Selective-Error Correction and further to multi-path fading correction, due to the FHSS or Frequency-Hopping Spread Spectrum, or other method of correction. The quality of this transfer is measured by other (PSNR), marked here: {PSNR}. The global quality is measured by the third (PSNR), called [PSNR]. One of the subjects of this invention is maximizing [PSNR] under dynamic (SNR)-conditions. Careful attention should be given to SNR-notation, summarized in Table 1. Typically, for wireless channels, we have $$\{PSNR\} < (PSNR) \quad (8)$$

and, in general, $$[PSNR] \leq (PSNR), [PSNR] \leq \{PSNR\} \quad (9)$$

TABLE 1

Various SNR-Definitions

| No. | DEFINITION | VALUE | GENERALITY | MEDIUM |
|---|---|---|---|---|
| 1 | SNR | Signal-to-noise in [dB] | Communication channel | Wireless, wired |
| 2 | (PSNR) | Video Intensity Levels | Video | Computer |
| 3 | {PSNR} | Video Intensity Levels | Video | Wireless, Wired |
| 4 | [PSNR] | Video Intensity Levels | Video | Computer + Channel |

Relationship Between (PSNR) and (BER): an Example

For purposes of this invention, it is important to establish a mathematical relationship between (PSNR) and (BER), assuming a specific example, in order to determine the relationship between bit-differences and intensity level-differences. The first parameter (a bit-reference) is a universal quantity for any bit-stream, and the second parameter (an intensity-level-difference) is specific for video streams. Assume an original S-image which is uncompressed and unhardened. Assume an N-bit image, with N-bits per pixel, and n×m-pixel resolution. Then, its number of gray-levels, is $$(CL) = 2^N - 1 \qquad (10)$$

Assume N=8; i.e., 8-bit gray level image; then, (CL)=255, because, $$255 = 1\cdot 2^7 + 1\cdot 2^6 + 1\cdot 2^5 + 1\cdot 2^4 + 1\cdot 2^3 + 1\cdot 2^2 + 1\cdot 2^1 + 1\cdot 2^0 = 128 + 64 + 32 + 16 + 8 + 4 + 2 + 1 = (11111111) = 2^8 - 1 \qquad (11)$$

We can see that the single bit error can create very different intensity errors, depending on what position it occurs. For example, if it occurs at the first bit from the left, then the intensity error will be 128, if at the second bit, then this error is 64, etc. Thus, the average intensity quadratic error per pixel is:

$$\frac{(128)^2 + (64)^2 + (32)^2 + (16)^2 + (8)^2 + (4)^2 + (2)^2 + (1)^2}{8} = \frac{21845}{8} \qquad (12)$$

On the other hand, the BER is probability of an error per bit; so probability of an erroneous pixel is N-times higher, or: 8 (BER), for N=8. Generalizing Equation No. 12, formula for Average Quadratic Error per Pixel, or (AQEP), is $$(AQEP) = \frac{\sum_{k=o}^{N}(2^k)^2}{N} = \frac{\sum_{k=o}^{N} 4^k}{N} \qquad (13)$$

So, from Equation No. 2, the MSE, is $$(MSE) = (AQEP)(BER) \cdot N = \frac{\sum_{k=0}^{N} 4^k}{N}(BER)N = (BER)\sum_{k=0}^{N} 4^k \qquad (14)$$

Substituting Equation Nos. 14 and 10, the general formula for (PSNR), as a function of (BER), is $$(PSNR) = 10\log_{10}\frac{(CL)}{\sqrt{MSE}} = 10\log_{10}\frac{(CL)}{\sqrt{(BER)\sum_{k=0}^{N} 4^k}} \qquad (15)$$

For example, for N=8, Equation No. 15 becomes $$(PSNR) = 10\log_{10}\frac{255}{\sqrt{21845(BER)}}, \text{ or} \qquad (16)$$

$$(PSNR) = 10\log_{10}(1.725)/\sqrt{BER} \qquad (17)$$

which is summarized in Table 2. We see that, in linear scale, PSNR is inversely proportional to $\sqrt{BER}$. The CL-value can be defined in many ways; e.g., it can be replaced by $(CL)^2$, as in common PSNR-definition. This is, because, in logarithmic scale, this value contributes as an additive constant. Thus, it does not influence PSNR-comparison estimations.

TABLE 2

PSNR vs. BER, for N = 8

| BER | PSNR*) |
|---|---|
| $10^{-3}$ | 17.4 dB |
| $10^{-4}$ | 22.4 dB |
| $10^{-5}$ | 27.4 dB |
| $10^{-6}$ | 32.4 dB |

*)In the PSNR definition, the linear (CL)-nominator is applied.

Equation No. 17 is derived under three conditions: a) only uncompressed S-image is considered, with N-bits per pixel, and $2^N-1$ number of gray levels; b) not more than one bit error per pixel, which is well satisfied for (BER)<<1; c) errors occur uniformly, and the bit stream is large; e.g., a video stream.

The (b),(c) conditions are well satisfied, especially (b). The condition (a) simplifies analysis; but for uncompressed and hardened image, Equation No. 17 also holds.

For a compressed image, on the other hand, various bits are differently sensitive to the (BER). For example, some control bits, such as motion vector bits are extremely sensitive to bit errors since they strongly influence the video performance. This instability can be compensated by introducing more priority into important bits, in such a way that high-priority bits are letter protected by BSEC.

Equation No. 17 also holds for 3-color RGB mode, with 3×8=24 bits per pixel, or 24 bpp, as well as for any pixel resolution: n×m.

Statistical Computing of PSNR Maximization

One of the key operations for improving the wireless communication signal integrity is forward bit error correction (BEC). BEC is a process in which additional information is added to the transmitted data stream in the form of check bits allowing for recovery from a number of errors. After receiving the data the check bit information is used to locate and correct errors. The check information is then removed from the data stream and the remaining data is the undistorted payload data. The efficiency of the forward error correcting is proportional to the number of check bits. In some cases the number of check bits is equal to the number of original bits known as "rate 1/2 schemes." In general the error correcting is defined as the ratio between the original number of bits to the total number of bits (original+check bits, or redundant bits). In general, our method is applicable to various types of BEC codes such as algebraic coding, convolution coding, concatenated and turbo coding.

Any type of operation aimed at improvement of digital data quality results in additional data to be inserted into the data stream. Such a solution increases the overall data rate making it impractical in the cases where only low bandwidth communication channels are available. We are proposing to embed the additional data directly into the payload data (image/video) in a way that would not adversely affect the video/image quality. The general approach of adding the enhancement data is similar to digital watermarking with the difference that the "watermarked" data is not applied for copyright protection or proof of ownership as is typical, but for operations such as forward error correcting, bit selective compressed stream encoding, packet header protection and others. The key feature is that the check bits are added using unique spatial distribution within the video/image frame and employing only the lowest level bit plane (bit plane 0).

Figure 2:
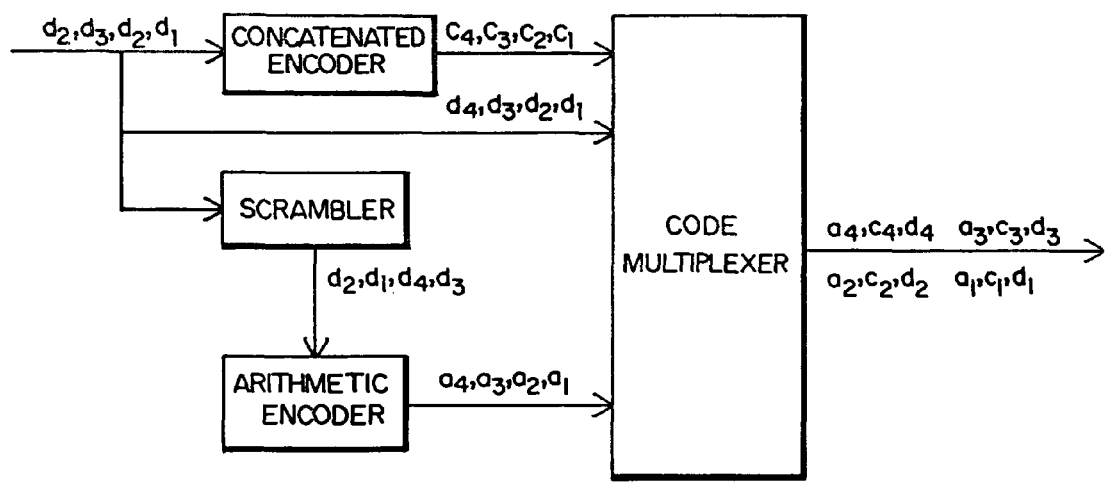
FIG. 2 is a block diagram of turbo Code 3/1.

The forward error corrected code consists of the original data and additional correcting bits. As an example, we will consider turbo code 3/1 in which each bit of the original data is encoded as a three bit error corrected codeword. The block diagram of the encoding process is shown in FIG. 2. The encoded stream contains the original bits and additional error correcting bits. These error-correcting bits are inserted as wotermat derivation of Equation No. 12, where low intensity bits are less important than high intensity bits. In the case of lossy video compression, such as MPEG; as well as watermarking, and header hardening (protection), this tendency of differentiating of more important bits from less important ones becomes even stronger. As a consequence of this tendency, the bit-selective error correction is proposed, where more important bits are protected by a larger number of redundant bits, needed for error correction. The general idea of error correction, well represented in prior art is based on adding some redundant bits into raw bits, in order to obtain some pre-determined property such as parity or others. The classical example is a credit card authentication code based on adding extra numbers to obtain some predetermined property. Consider, for example, the credit card code, which in order to be authenticated, should have a total sum of 34. In order to realize this task, consider a raw code: 2358932, which by adding: 2+3+5+8+9+3+2=32; i.e., not 34. Thus, we add a redundant number of 2 in the form: 23589322. Such a number, indeed, summarizes to 34; thus, it is an authenticated number.

Thus, adding some redundant numbers constituting a bandwidth OVH, improves either BER, or authentication, or both. This is a general idea of image hardening. As a result, Equation No. 17 cannot be easily generalized for hardened image cases. Therefore, we have to build the statistical averaging, or ensemble averaging procedure, which can be computed in in-house lab conditions. Referring to FIG. 1, we can provide test video imagery, known to Rx, that is transmitted through an RF-wireless communication channel, with pre-selected (BER). The resultant R-image is compared with original S-image, in order to compute [PSNR]. The process can be repeated many times until a full statistical ensemble is built, in the form of the histogram, illustrated in FIG. 3. The resultant statistical average of [PSNR], denoted as <[PSNR]> is taken for further considerations.

The resolution of this procedure is defined by sampling constant of ($\Delta$[PSNR]).

For a given (BER), if (CR)-value increases, then more redundant bits vs. raw bits are required, and, as a result, the {PSNR}-errors can be more significant. If (CR)-decreases, on the other hand, less (OVH)- is required, so more (BER)-values remain for R-image. For (BER)=0, or (BER)-value very small (such as $<10^{-9}$), the communication channel does not influence the video performance.

If (BER)-suddenly grows, due to channel worsening, then the image interruption, or serious destruction is highly possible, and the procedure needs to start in order to preserve continuous, or almost continuous RF-wireless video communication. Otherwise, the image structure will be very unstable which could cause frequent communication breaks. The subject of this invention is to provide a procedure that such frequent communication breaks can be avoided. In order to achieve this, we need to obtain the following relation: [PSNR]-statistical average vs. (BER)-value, in the form:

$$<[PSNR]>=f(BER) \qquad (18)$$

Figure 3:
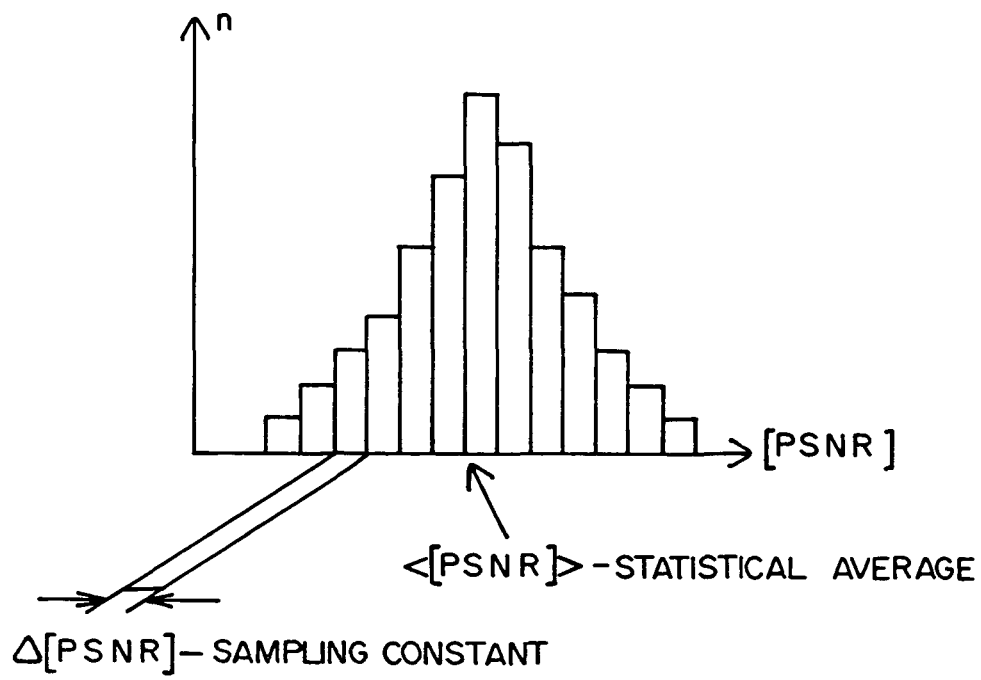
FIG. 3 is a hypothetical histogram distribution for measurement of [PSNR] for fixed (BER) and image format.

Since many parameters are involved, such as Signal-to-Noise-Ratio (SNR); available bandwidth, $B_A$; image format (such as VGA-video); CR; OVH; and many others, the theoretical modeling of Equation No. 18, besides such simple cases as that of Equation No. 17, is very difficult, if possible at all. As a result, we need to apply some statistical data, such as that illustrated by the histogram shown in FIG. 3. Fortunately, such a procedure can be provided in in-house lab conditions, producing a kind of [PSNR] vs. (CR)-curves, or PC-curves, as shown in FIG. 3. These plots are stored in the memory/library.

The statistical procedure for [PSNR]-maximizing is as follows. The RF system transmits, periodically, the test video images, and [PSNR] is computed, or (BER)- is calculated. In the case, when [PSNR] drops and (BER) increases, we also compute from a computer modeling, a $\Delta$(BER) which is needed in order to reduce the (BER) into acceptable level $(BER)_O$. This result yields necessary OVH-value that should be satisfied in order to achieve predescribed (BER). After this value is found, we compute needed (CR)-value from the relation:

$$\frac{B_0(1+\delta)}{(CR)} + OVH = B_A \qquad (19)$$

where $B_o$—is the original bandwidth of the original video stream, $\delta$—is bandwidth fraction for encryption, and the first term represents the compressed payload video bandwidth, which added to the OVH should not exceed the $B_A$. It should be emphasized that the OVH-term contains all redundant video bits, including those coming from: lossy compression, error correction, authentication, header, watermarking, etc. The exceptions are crypto-bits that are included in $\delta$-factor of Equation No. 19.

Figure 4:
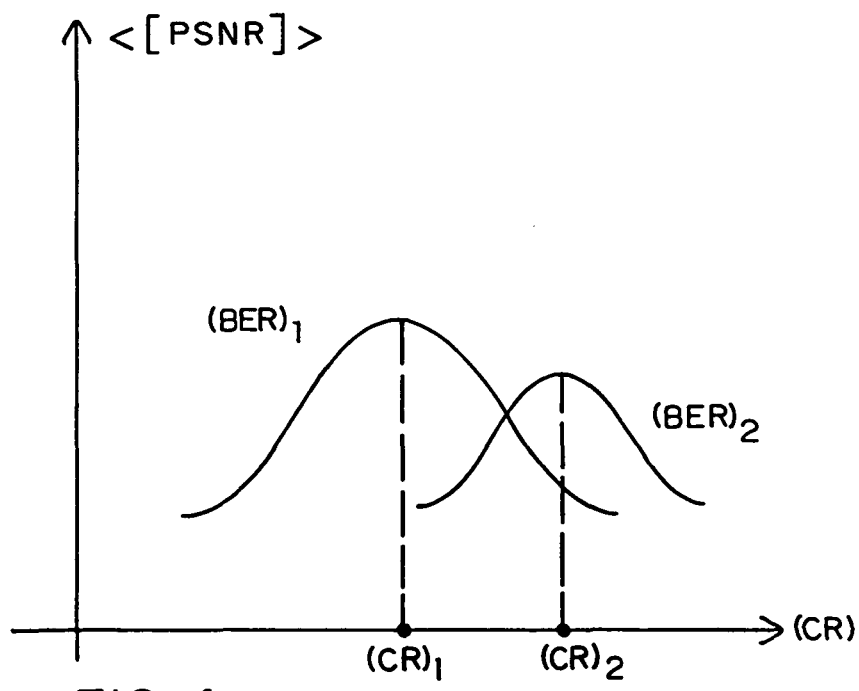
FIG. 4 is an illustration of PC-curves, demonstrating statistical average of global [PSNR] vs. (CR)-compession ratio, with maxima shifted into larger (CR), for larger (BER); i.e., $(BER)_2$ $(BER)_1$; the (BER)-values are obtained from final R-Image.

The above procedure does not require [PSNR] field measurements, only in-house [PSNR] lab measurements, leading to the PC-curves as shown in FIG. 4, where optimum values: $(CR)_1$ and $(CR)_2$—are applied. The only field measurement is that of global (BER), that fully characterizes properties of RF-wireless channels, including RF-medium, and Tx/Rx-system. The obtained (BER)-value, such as $(BER)_1$, automatically defines the related PC-curve, as shown in FIG. 4, and its equivalent $(CR)_1$-value, which in turn has been obtained from the bandwidth budget Equation No. 19. Strictly speaking, the (OVH)-value in Equation No. 19 is also a function of (CR), since it is composed of two factors:

$$(OVH)=(OVH)_C+(OVH)_R \qquad (20)$$

where $(OVH)_C$—is the OVH-factor coming from video compression redundant bits, and $(OVH)_R$—represents all remaining redundant bits. Therefore, the exact Equation No. 19 has transcendental form which must be solved by a sequential adjustment. First, we select $(OVH)_R$, for given $B_A$. Then, the remaining part of Equation No. 19, is $$\frac{B_0(1+\delta)}{(CR)} + (OVH)_c(CR) = B_A - (OVH)_R \qquad (21)$$

where $B_o$, $\delta$ are fixed values, and $$(OVH)_c=(CR) \qquad (22)$$

is known from the specific type of video compression. Then, we solve Equation No. 21 numerically, to obtain (CR)-solution.

In the case of very important video streams, defined by a given application scenario, or for other reasons, in addition to (BER)-field measurement, it is also necessary to obtain the field measurements of the [PSNR]-value. In such a case, we operate in the vicinity of the maximum of PC-curve to obtain a number of [PSNR]-values from field measurements. If the test video streams are sufficiently lengthy; i.e., contain a larger number of video cycles (or, "M-scenes"); say, >10, then the obtained [PSNR]-values will be sufficiently stable, close to <[PSNR]>-statistical average value, according to the ergodic hypothesis (see, e.g., Reference No. 13). Under such ergodic assumption, the experimental statistical procedure will be stable and effective.

Memory, Watermarking, Time Streams and Metadata

As another aspect of this invention, in order to provide effective optimization of the video RF-transmission performance, in the form of maximizing [PSNR], we also need to consider such auxiliary issues as: packetizing memory, watermarking, time stamps, and metadata. First, it should be emphasized that the bandwidth budget Equation No. 19 also includes the header redundant bits. These bits depend on the form of packetizing, defined by specific network protocols, and as such are outside of our system for optimizing. Nevertheless, they should be included in the (OVH)-term, in Equation No. 19. This global (OVH)-term also includes extra bits that can be implanted into the payload to provide extra-header protection. They should also occasionally change their intra-frame, and inter-frame locations, if they constitute the part of watermarking for authentication purposes. They should also occasionally change the crisp rules in order to maximize [PSNR], based on its field measurement. The crisp rules are based on selection of the sequence:

$$(CR)_o \to (CR_1) \to (CR)_2 \to \ldots \to (CR)_M$$

where M-number of samples. For each sample value of $(CR)_1$, we solve the bandwidth budget equation, in order to obtain (OVH), and transmit sample video streams through channel, and then, measure of $[PSNR]_1$. The procedure should be repeated, following the above sequence. The crisp rules are:

a) If $(CR)_{n+1}>(CR)_n$, and $[PSNR]_{n+1}>[PSNR]_n$, then $(CR)_{n+2}>(CR)_{n+1}$ b) If $(CR)_n+_1>(CR)_n$, and $[PSNR]_{n+1}<[PSNR]_n$, then $(CR)_{n+2}<(CR)_{n+1}$ c) If $(CR)_{n+1}>(CR)_n$, and $[PSNR]_{n+1}<[PSNR]_n$, as well as if $(CR)_{n+1}<(CR)_n$, and $[PSNR]_{n+1}<[PSNR]_n$, then $n=n_o$, and $[PSNR]_n=[PSNR]$max, with accuracy to $\Delta(CR)$-sampling constant.

Steps (a) and (b) should be repeated, until the maximizing step (c) is achieved, to find the maximum location: $n=n_o$. The process can be continued for smaller $\Delta(CR)$-sample constant, or it could be widened to find all possible maxima. The minima are found in a similar way.

The memory, for our purposes, should contain a usual portion of compressed video, without crypto. This is stored in the buffer of the Tx-part of the camera sensor. It is time-stamped, in at least two ways. One way is standard, and constitutes the metadata in the form of time moment, such as a data of the frame. The second way is unique and comes as a consequence of the meaningful frame idea, namely numbering each M-frame, and all daughter frames belonging to this M-frame cycle. In addition, each M-frame, or I-frame can be extra-stored, as representing the spatial event, either by higher-performance lossy compression, such as wavelet instead of MPEG; or, higher resolution, if mega-pixel cameras are occasionally used, or M-frames are stored in fragments. Under the request from $R_x$, any of those frames can be transmitted, or their modifications, as only a fragment of a high-resolution frame, for example.

Still Image Compression

Another aspect of the present invention uses a novel technique for achieving relatively high values of compression of still images. This inventive technique relies on the known wavelet compression concept combined with a method of maximizing SNR or minimizing MSE as previously described. This unique combination permits achievement of perceptually lossless transmission of still images with as much as 30:1 compression ratios.

Wavelet Compression

An understanding of this inventive process is facilitated by the following general background discussion of wavelet compression technology.

The technology analyzes and represents signals in terms of wavelets—functions that have both time and frequency domains. The wavelet transform decomposes the image into a multi-frequency channel representation, each component of which has its own frequency characteristics and spatial orientation features that can be efficiently used for coding.

In video/image processing, a series of high pass and low pass filters are typically applied to an input signal. Sub-band coders transform two-dimensional spatial video data into spatial frequency filtered sub-bands. Then adaptive quantization and entropy encoding processes provide compression.

The Discrete Wavelet Transform essentially consists of passing a signal, such as an image, through a pair of filters, a low pass filter and a high pass filter. The low pass filter yields a coarse or low resolution version of the signal. The high pass filter yields an added detail or difference signal. The outputs of the two filters are then downsampled by two. Thus, at this point the downsampled outputs have the same number of bits as the input signal. The parameters of the two filters are selected so that when the upsampled output of the low pass filter is added to the upsampled output of the high pass filter, the original signal is reproduced.

The output of the high pass filter, the added detail signal, may then be fed into another pair of filters and the process repeated. The output of the low pass filter is a coarse approximation of the original input signal. When the input signal is an image, this means a low-resolution version of the original image. The output of the high pass filter is an added detail or difference signal. When combined with the coarse approximation, as described, the original input signal is exactly reproduced. The coarse approximation is sometimes called a base layer and the added detail is sometimes called an enhancement layer. The output of the high pass filter, can be fed into another pair of filters, repeating the process. The Discrete Wavelet Transforms used in wavelet image and video compression iterate the process many times. The output values are called transform coefficients or wavelet transform coefficients.

Compression is typically achieved by applying some form of quantization, scalar quantization in simple implementations and vector quantization in more complex implementations, to the added detail signals. Some type of entropy coding may be applied to the quantized transform coefficients. For image coding, the notion is that the human visual system is less sensitive to fine details in the image than to the gross features. Thus quantizaton can be applied to the detail signals more strongly.

Wavelet functions offer three key advantages: They correspond more accurately to the broadband nature of images than do the sinusoidal waves of Fourier transform; they can be implemented with simple filters that result in low-cost chip; they also provide full-image filtering to eliminate block-shaped artifacts in the compressed image.

Once the image has been transformed, the data can be used to implement what appears to be a nearly lossless compression; achieve lossy compression at either constant quality or constant bit rate; create high-quality scaled images without computational overhead; create an error-resilient compressed bit stream, because each block contains information about the whole image.

The inventive method employs advantageous wavelet compression, but in a novel way which exploits the present invention's unique capability to maximize SNR. More specifically, in the present invention the coefficients of the base layer wavelets (i.e., spatial frequencies) are varied for different regions of the image based on perceptions of texture to achieve the best SNR or lowest MSE in the transmission of the compressed still image. The result is a perceptually lossless transmission of a still image with higher compression ratios than previously possible for such high quality still image transmission.

To better understand this method the following background is presented:

In general, in any type of lossy compression method based on Fourier analysis such as JPEG or Wavelet, one is always dealing with some type of non-linear analysis of Fourier coefficients in such a way that one puts greater degrees of quantization layers (such as intensity quantization layers) to more important coefficients and vice versa. The difference between the compression based on original Fourier analysis such as JPEG and packet-type Fourier analysis such as Wavelet, is that in the former there is no correlation with image segments (i.e., areas of an image frame with specific image context such as an object). In wavelet-type compression there is such correlation. Therefore we can use different quantization tables with different non-linearities for respective frame segments or contextual frame fragments. Any still image compression scheme where there is a correlation between transform coefficients and contextual fragments of an image frame can employ this method. One such technique which exhibits such correlation is the wavelet Malat scheme which is therefore appropriate because of the invention's highly parallel computing ability for carrying out a very complex decision tree.

Figure 9:
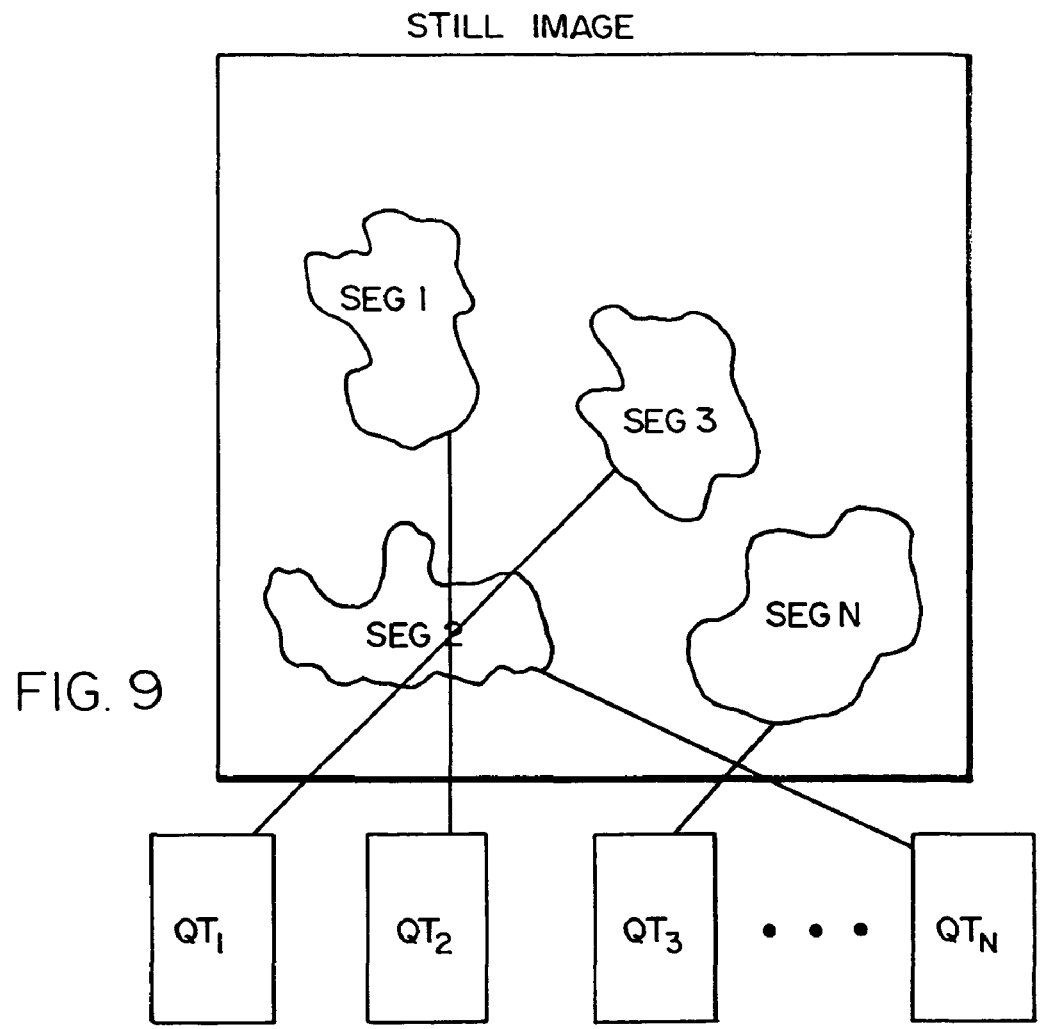
FIGS. 9 and 10 are conceptual illustrations used to explain a novel higher lossy compression, but perceptually lossless, technique for storing or transmitting high quality still images.
Figure 10:
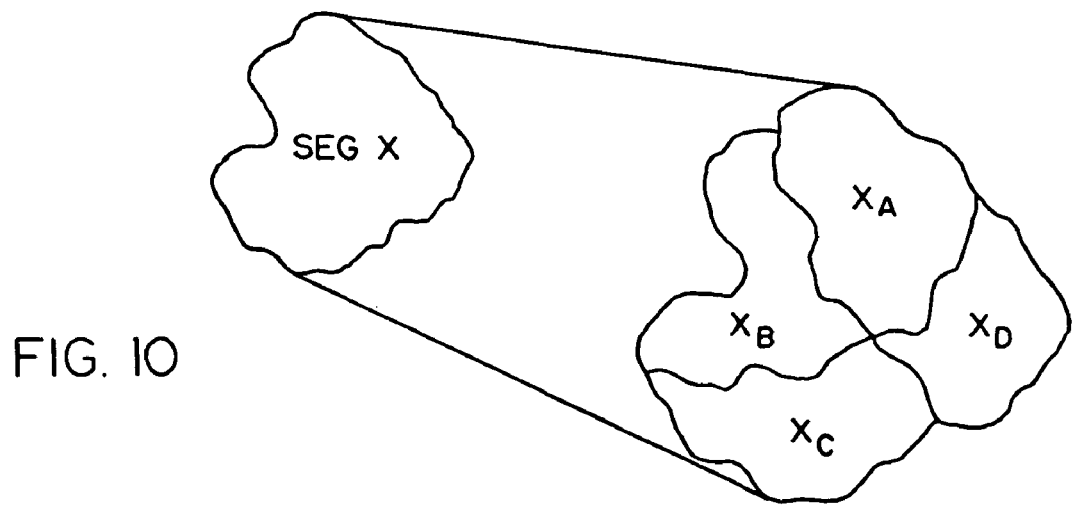

The method hereof is illustrated in FIGS. 9 and 10. FIG. 9 shows a still image having a number of distinct objects or contextual frame segments and a plurality of quantization tables each having a different form of non-linear quantization parameters. Each frame segment may be compressed according to a lossy compression algorithm using a different quantization table to achieve maximum PSNR for that segment according to a complex decision tree. The highly parallel processing capability of the present invention facilitates such complex decision trees. In the event that the best segment quantization table for a particular segment still yields a lower than desired PSNR, that segment may be further segmented as depicted in FIG. 10 and the process repeated on a sub-segment basis. The increased segmentation may be based on that segment's texture, texture histogram, or both.

Tandem Concept

The tandem concept is a necessary ingredient of the proposed CARNET (Continuous Adaptive Real-time NETwork) system. This is, because, the CARNET also performs unique pre-ATR data reduction, discussed below. If we assume that a tandem consists of two cameras: the 360°-view fish-eye camera, and limited-view PZT-camera. First, the fish-eye camera starts, and if the target is picked up, the second (slave) camera takes the target tracking, based on full-view of fish-eye camera (a master).

Pre-ATR Data Reduction Based on Motion Flow Analysis

There is a very large number of papers and patents proposing various methods of pattern recognition, or, using military language, Automatic Target Recognition (ATR), based mostly on Fourier analysis including wavelets, novelty filtering, and others. This disclosure does not address this area, however. Instead, it addresses a related area, namely, before the ATR can be applied, called here Pre-ATR data reduction. There is a fundamental trade-off between the complexity of the ATR method and its data reduction. The more complex the ATR, the more difficult, and less effective the data reduction, and vice versa.

For example, for simple pointing sensors, such as acoustic range finders, the data reduction is rather simple, but for some application scenarios it is quite non-trivial, as shown below. Here, we address the problem of cooperative sensor network, where a number of acoustic (optical) sensors perform a joint operation.

Acoustic Sensors for Edge Detection: An Example

Consider cooperative sensor network of non-visual sensors, such as acoustic range finders, for such a specific application as avoiding track's rollover on unmarked road edges in difficult terrain, such as in Iraq or Afghanistan. In the case of advanced road systems as in the United States, such roads are, at minimum, marked by white lines, for example, which makes the problem of ATR much easier. In contrast, in the case of unmarked roads the ATR, based on visual sensors such as cameras, usually fails, because of poor data reduction.

Figures 5A, 5B:
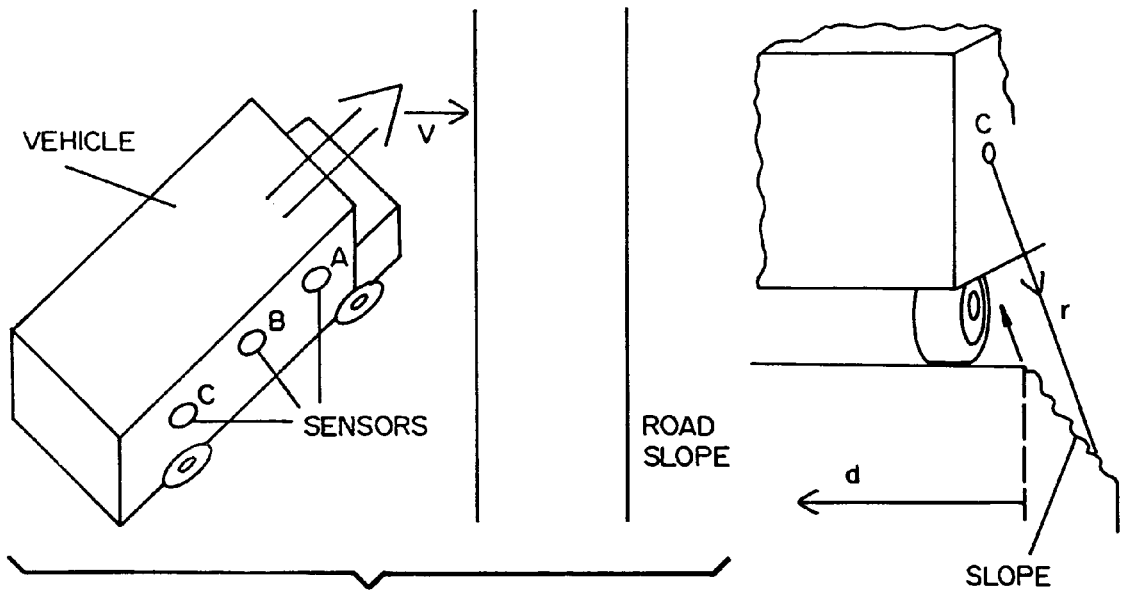
FIGS. 5A, 5B and 5C are illustrations of a sensor network of acoustic range finders, measuring time delay of 2r/c, where c-speed of sound, including.
Figure 5C:
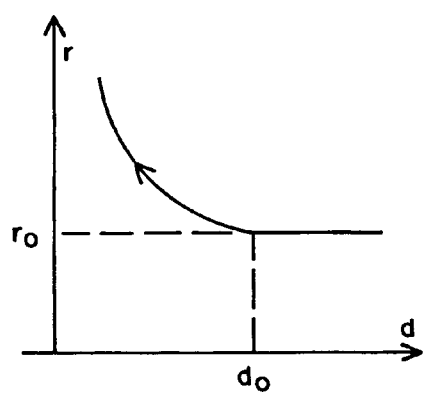

Consider a vehicle (truck) with three (or more) acoustic range finders: A, B, C, as shown in FIG. 5A. Each sensor range finder located at a distance, d, from the road edge will measure a range of r from the road slope, as shown in FIG. 5B, due to measuring time delay of 2r/c-where c-speed of sound. Larger d, smaller r, until r-remains constant, as shown in FIG. 5C.

Where the vehicle (truck) starts to "slide down" from a road, approaching a road slope, as shown in FIG. 5A, the first A-sensor reacts, then B-sensor, and then C-sensor. This reaction is manifested by increasing distance r, as shown in FIG. 5B, or as shown in FIG. 5C. For data reduction purposes, we quantize distance-r, into 6 values: 0, 1, 2, 3, 4, 5 where "0" is equivalent to constant distance-$r_o$, as shown in FIG. 5C; i.e., when the truck is far away from the road slope. The symbol "1" describes a distance range closest to $r_o$, within the $\Delta r$-resolution range, which is 1 cm, for example. The higher numbers: 2, 3, 4, 5 represent respectively higher distance ranges. When the car approaches the slope, the numbers corresponding to sensor reading increase monotonically, as: 0, 1, 2, 3, 4, 5. When, due to an alarm and proper action the process is reversed, the numbers start to decrease. The sequential sensors: B and C follow the trend stimulated by leading sensor-A. As a result, we obtain the simple numerical patterns which uniquely describe the car motion evolution, as shown in FIGS. 6A, 6B, 6C and 6D.

Figure 6A:
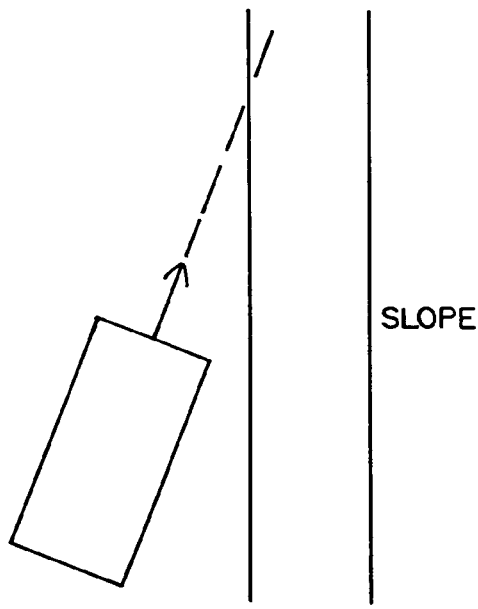
FIGS. 6A, 6B, 6C and 6D are data reduction patterns for road edge detection by applying such point sensors as acoustic range finders, including.
Figure 6B:
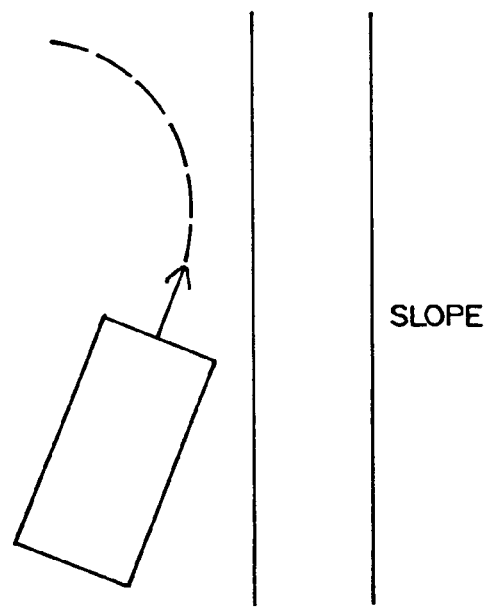
Figure 6C:
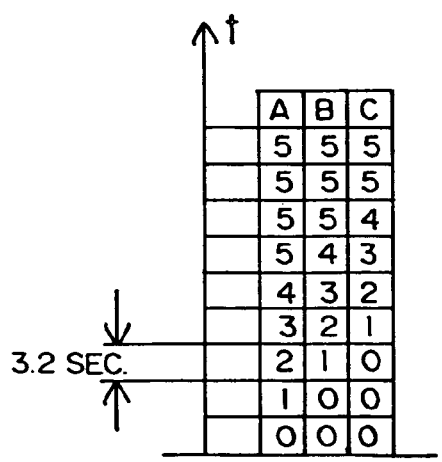
Figure 6D:
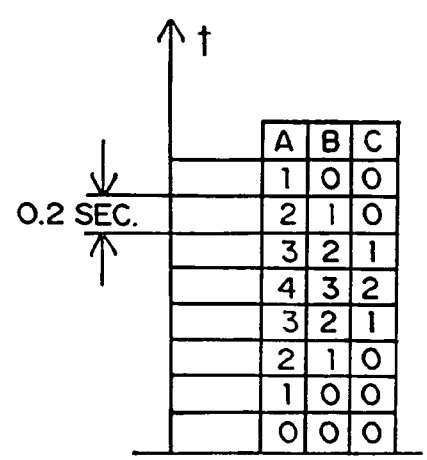

Such simple data reduction patterns as shown in FIGS. 6C, and 6D, allow application of template matching into road edge detection scenario, and define soft alarm, or yellow alarm; and hard alarm, or red alarm, by using predefined danger of the catastrophe pattern leading to rollovers. Since, typical acoustic range finder time response is 0.2 sec; then, assuming moderate car speed of 36 km/hour, equivalent to 10 m/sec, and for typical car "sliding" angle of 5°, or 0.1 radians, we obtain 1 m-slide per second. Therefore, assuming minimum three (3) sensor readings, sufficient to recognize the DRP, or data reduction pattern, we obtain 0.6 sec-time sufficient for effective alarm. This is a realistic scenario, considering typical 0.1 sec to 0.3 sec of human reaction speed. Therefore, we obtain a successful scenario for data reduction, based on simple acoustic sensor fusion.

Unfortunately, such simple data reduction scenario is not possible for much more complex visual sensors, based on camera readings, both visible, and IR, or infrared.

Pre-ATR With Visual Sensor Network

The Pre-ATR data reduction is a challenge for visual sensors, such as cameras, either stataic, or On The-Move (OTM). The OTM visual sensors are installed on moving platforms such as UGVs (Unmanned Ground Vehicles), or other moving vehicles. The challenge is identification (ID) of moving a target, or an object, because in the fully automatic (robotic) case, the visual sensors need to identify the same object of interest, without manual help. Such fully autonomous ID can be a problem in the case when a number (a few or a lot) moving objects, or targets are within the field of view (FOV) of a number of visual sensors. The ID of specific target of interest, the same one for all sensors of interest, is a necessary condition to provide an effective ATR. Thus, the proposed Pre-ATR data reduction, which is the subject of this innovation, will focus on finding position (location) of the moving target, and, then, determining its speed vector, without human intervention, by applying motion flow analysis, being the subject of the invention of this disclosure.

Pre-ATR ID From its Location

Figure 7:
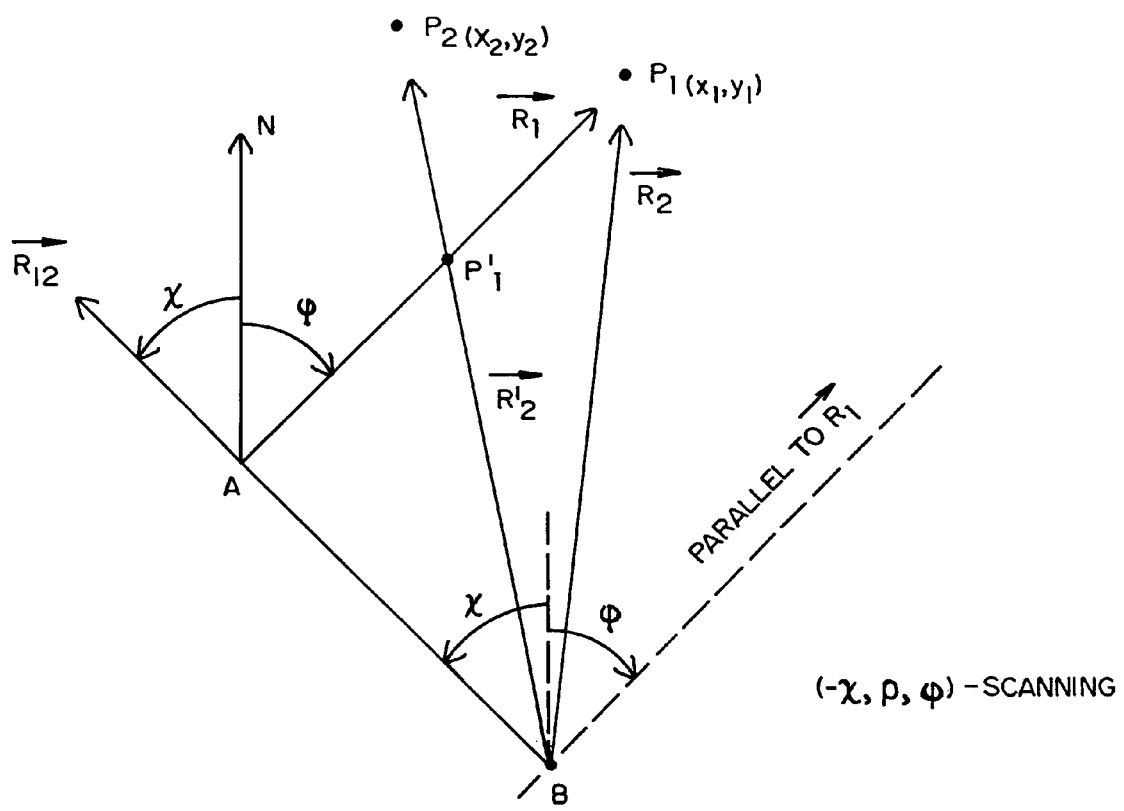
FIG. 7 is an illustration of a procedure of cooperative triangulation, in order to differentiate target $P_1$ from its "decoys," such as $P_1'$.

Assume we have a number of moving (or, static) objects, and a number (at least three) of the OTM or static visual sensors, as shown in FIG. 7, when sensor A & B and targets $P_1$ and $P_2$ are considered. Assume, the visual sensors have the GPS and azimuth (geographic North, N) findings' ability, including A, B-locations, a directional vector $\vec{R_{12}}$, as well as angles $\chi$ and $\rho$ in respect to N-direction. Assume, the sensor A is a master, identifying $P_1$ as the primary target of interest; thus, $\vec{R_1}$-vector is defining the $P_1$-position in respect to A-sensor. Both sensors have time-stamped frames, and can synchronize the clock in order to provide a measurement at the same time. At the start, the master-sensor A sends control data to slave-sensor B (the master-slave relation is automatically defined by the fact, that the A-sensor was first to recognize the target of interest $P_1$), in the form of coordinates (azimuth, location) of vector $\vec{R_{12}}$ and $\vec{R_1}$, thus, sensor B defines the search area at the angle between $\vec{R_{12}}$ and vector parallel to $\vec{R_1}$, as shown in FIG. 7. Assume, within this area, there are two targets of interest $P_1$ and $P_2$, and, of course, the sensor B "does not know" which target: $P_1$ or $P_2$, has been identified by the master-A, as the primary target. Thus, the sensor-B "finds", by triangulation, two possible target locations: $P_1$, which is correct location, and/or $P_1'$—which is incorrect location, of "decoy" target. Both positions are sent by a sensor B to sensor A. In a parallel manner, the A-sensor sends the same request to sensor C, not shown in FIG. 7, and the procedure repeats, with two or more target locations, where only one target is the correct one, and the rest of them are "decoys." Now, the master sensor, A, reviews all triangulation pairs between A and B, and A and C, which are:

$AB(P_1) AB(P_1')$, $AC(P_1)$, $AC(P_1')$, $AC(P_1')$, etc. Only one pair coincides, namely: $AB(P_1)$ and $AC(P_1)$. Therefore, the A-sensor "concludes" that its target ($P_1$)-location, is determined by triangulation pair: $AB(P_1)=AC(P_1)$. After this, the A-sensor requests to pinpoint tandem systems of one (e.g., B), two (e.g., B and C), or more sensors into target $P_1$. The tandem defined above, and a required number of sensors for tendering $P_1$ is defined by specific ATR-protocol. Then, the conventional ATR procedures can start, not being the subject of this invention.

Having target location found, the A-sensor can compute, by triangulation, its distance, $R_1$, from the A-sensor. Then, using simple lens imaging formula (see Reference No. 10), it can also find its size, and aspect ratio, the latter defined as ratio of its vertical-to-horizontal sizes. This can be done only by triangulation, without using a range finder (acoustic, laser one, etc). The basic innovation is a fully autonomous procedure to separate the primary target-$P_1$, from its decoys. Without this novel procedure, we are not able to ID-target, when more than one target exists. If target/sensor are in motion, we need to synchronize frames.

Pre-ATR ID From its Speed Vector

In parallel to finding a target's location, we need also to find its speed vector $\vec{V}$. This is because knowing the speed vector module, or $|\vec{V}|$, or V, and its direction, provides crucial pre-ATR information. The continuous communication, and flow vector analysis, discussed above, are ingredients for this inventive feature.

Consider the primary target $P_1$, on the move, or OTM. This target is monitored by two tandem sensor systems (1) and (2), as shown in FIGS. 8A, 8B and 8C. It can also be monitored by single cameras, as shown in FIGS. 8B and 8C, located at UGVs, for example. Such a UGV, with camera, is shown in FIG. 8B. By azimuth finder and speed meter, the sensor (1) "known" its UGV-vector $V_{01}'$, and camera direction vector $R_1$; the same with sensor (2). The target speed vector, in respect to sensor (1) is $\vec{V}_1'$ as shown in FIG. 8A, but the sensor can monitor only its P-projection $\vec{V}_{1P}'$ as shown in FIG. 8C. A camera can monitor only projection of the motion into p-projection, which is perpendicular to camera-axis, or $\vec{R}_1$, as shown in FIG. 8C.

Therefore, the target speed vector projections, in respect to $P_1$ and $P_2$-projections, are:

$$V_1 = V_{01p}' + V_{1p}' \quad (23a)$$

$$V_2 = V_{02p}' + V_{1p}' \quad (23b)$$

where $\vec{V}_{01p}'$ and $\vec{V}_{02p}'$, are p-projections of UGV speed vectors $\vec{V}_{01}'$ and $\vec{V}_{02}'$, measured by UGVs' speed meters, while $V_{1p}'$ and $V_{2p}'$ are p-projections of target vector: $\vec{V}'_1$ and $\vec{V}'_2$, measured by motion flow, namely, a number of pixels per unit time passed by the target automatically measured at the camera screen, which is a known procedure.

Following the speed vector graph shown in FIG. 8A, we obtain $$V\cos\beta = V_1, \text{ or } \cos\beta = \frac{V_1}{V} \quad (24a)$$

$$V\cos\alpha = V_2, \text{ or } \cos\alpha = \frac{V_2}{V} \quad (24b)$$

$$\alpha + \beta = \theta \quad (24c)$$

which $\alpha$ is the angle between $\vec{V}$ and $\vec{V}_2$-vectors, and $\beta$ is the angle between $\vec{V}$ and $\vec{V}_1$-vectors, while $\theta$ is angle between $\vec{V}_1$ and $\vec{V}_2$-vectors. Thus, we have the system of three equations with three unknowns: $\alpha$, $\beta$, and $V$ since $V_1$ and $V_2$ are found from Equation No. 23, while $\theta$ is found from camera azimuth readings for sensors (1) and (2). Since, $$\cos(\alpha+\beta) = \cos\alpha\cos\beta - \sin\alpha\sin\beta = \cos\theta \quad (25)$$

by substituting Equation No. 24 into Equation No. 25, we obtain, $$V^2 = \frac{V_1^2 + V_2^2 - 2V_1V_2\cos\theta}{\sin^2\theta} \quad (26)$$

then, angles $\alpha$ and $\beta$ can be found from Equation Nos. 24a and 24b. We see that for $\theta = 90°$—, we obtain: $V^2 = V_1^2 + V_2^2$, as expected. Therefore, the vector $\vec{V}$ has been found (both module and direction).

In summary, we obtained the following pre-ATR information, by providing effective data reduction for a moving target, assuming moving sensors ($\vec{V}_{01}', \vec{V}_{02}'$), or static sensors ($\vec{V}_{01}', \vec{V}_{20}' = 0$) Also, one sensor can move and the other can be static, or even only a single moving sensor can be used. In the later case, we assume that movement of the target is much slower than that of the monitoring sensor, and relevant synchronization of frames is provided. The results are:

1) Fully-autonomous procedure has been provided, without human intervention, assuming relevant pre-ATR protocols have been applied.
2) Primary target has been identified in the presence of other targets, by elimination of "decoys."
3) Location of this target has been found.
4) Speed vector of this target has been found.

The results (1-4) allow starting some conventional ATR-procedure, which can be provided by sensor master-A, by using relevant M-frames collected in the sensor's Tx/Rx-buffer.

Based upon the foregoing, a method of reducing target data in a visual sensor network for subsequent ATR comprises the steps of:

a) collecting from each sensor in said network visual data regarding a field of prospective targets;

b) employing a plurality of parallel processors to analyze each sensor's visual data and define scenes, each such scene comprising a plurality of related frames including a single M-frame showing a significant spatial event and a number of D-frames each showing a temporal change relative to said spatial event; and c) compressing said M-frames and said D-frames (or, daughter frames) at respectively different compression ratios for storing said scenes.

An additional step would then use such visual data to identify a primary target and discard the remaining targets as decoys. The method may also determine the location of the primary target as well as its speed and direction. The inventive process may also use different compression ratios for M-frame data and D-frame data including using that step for maintaining uniform image quality over the network of visual sensors or for adjusting quality in a given visual sensor over time. Moreover compression may be carried out in separate stages, such as one stage of compression for both M-frames and D-frames and then additional stages of compression for D-frames which may have a higher total compression ratio than M-frames.

It will now be understood that various aspects of an invention directed to improving performance of digital video data storage and transmission have been disclosed herein. Although preferred embodiments have been described, the scope hereof is not to be limited to those embodiments but only by the appended claims and their equivalents.

REFERENCES

The following references are hereby incorporated herein by reference as if fully set forth herein:

1) T. Jannson, D. H. Kim, A. A. Kostrzewski, and I. V. Ternovskiy, "Soft computing and soft communication (SC2) for synchronized data, (Invited Paper), SPIE Proc. vol. 3812, pp. 55-67, 1999.
2) T. Jannson, A. A. Kostrzewski, P. Shnitser, D. Kim, and I. V. Temovskiy, "Soft computing, advanced video/imagery processing and communications," (Invited Paper), SPIE, Proc. vol. 4120, pp. 120-133, 2000.
3) T. Jannson, et al, "Soft computing and small system integration," SPIE Proc. 5558-10, 2004.
4) T. Jannson and A. A. Kostrzewski, "Small communication platforms, PCMCIA-packaging and soft computing for UGV applications," SPIE Proc. vol. 4024, pp. 326-340, 2000.
5) A. A. Kostrzewski, T. P. Jannson, and S. Kupiec, "Soft computing and wireless communication," (Invited Paper), SPIE Proc. vol. 4479, pp. 70-74, 2001.
6) T. P. Jannson, A. A. Kostrzewski, D. S. Kang, B. Son, C. Lee, J. H. Kim, K. Kolesnikov, "Soft computing and soft communication (SC2) hybrid RF-wireless communication platforms and interface for BLOS and sensor WLAN applications," SPIE Proc. vol. 4479, pp. 75-82, 2001.
7) T. P. Jannson, A. A. Kostrzewski, Thomas Forrester, S. A. Kupiec, and T. A. DeBacker, "Aerogels, SC2 compression, and Gbytes flash memories," (Invited Paper), SPIE Proc. vol. 4479, pp. 96-104, 2001.
8) T. Jannson, A. A. Kostrzewski, I. V. Temovskiy, "Super-fast supercomputer class on-board processing for visual sensor NMD applications," SPIE Proc. vol. 4367, p. 513, 2001.

9) T. Jannson, A. Kostrzewski, S. N. Ro, T. Forrester and T. Hester, "Soft computing techniques in network packet video," SPIE Proc. vol. 5200-27, 2003.
10) T. Jannson, A. Kostrzewski, I. Ternovskiy, "Nearly-autonomous mode of operation and navigation in UGVs," SPIE Proc. vol. 4364, pp. 7-11, 2001.
11) T. Jannson, A. Kostrzewski, W. Wang, and T. Hester, "Soft computing and minimization/optimization of video/imagery redundancy," SPIE Proc. vol. 4200-28, 2003.
12) T. P. Jannson, A. A. Kostrzewski, B. K. Sun, W. Wang, K. Kolesnikov, S. A. Kupiec, "Soft computing, visual communication, spatial/temporal events, and optimum bandwidth utilization, (Invited Paper), SPIE Proc. vol. 4787, pp. 137-146.2002.
13) M. Born, E. Wolf, Principles of Optics, Cambridge University Press, 7$^{th}$ Edition, p. 561.
14) T. Jannson, A. A. Kostrzewski, K. Lee, T. Hester, T. Forrester, G. D. Savant, "Soft computing and small system integration, SPIE Proc. vol. 5558, pp. 47-56, 2004.

We claim:

1. In a wireless communication channel for transmitting compressed digital video data from transmitter to a receiver, a method of hardening a transmitted video data stream to avoid image interruptions despite changing channel conditions; the method comprising the steps of:
   a) organizing streaming video frames into scenes defined by a single M-frame and a number of corresponding D-frames where M is meaningful and D is daughter and D-frames not significantly changed from their corresponding M-frame;
   b) calculating the mean square error (MSE) of a video stream that is compressed, transmitted through said channel and reconstructed at the receiver, said calculation being carried out by highly parallel processors to compare pixel intensity variation between the M-frame and corresponding daughter frames of respective scenes;
   c) deriving peak-signal-to-noise-ratio from the measured MSE to indicate quality of communication;
   d) periodically transmitting known data through said communication channel to establish a statistical relation between peak-signal-to-noise-ratio and bit error rate for changing channel conditions; and
   e) depending upon the outcome of steps c) and d), providing at least one of forward bit error correction and compression ratio modification to change hit error rate to avoid image interruptions.

2. The method recited in claim 1 wherein step e) comprises the step of increasing compression ratio to reduce bit error rate.

3. The method recited in claim 1 wherein step e) comprises the step of providing forward bit error correction as data embedded into the video data stream as an imperceptible watermark.

4. The method recited in claim 1 wherein step e) comprises the step of modifying the compression ratio until a maximum peak-signal-to-noise-ratio is obtained.

5. The method recited in claim 1 further comprising the step of compressing M-frame data differently from D-frame data.

6. The method recited in claim 1 further comprising the step of storing said video data prior to transmitting said data, and wherein said M-frame data is stored in a first format and said D-frame data is stored in a second format.

7. The method recited in claim 1 wherein said video data comprises payload data and overhead data and wherein step e) is carried out to provide greater hardening for said overhead data than for said payload data.

* * * * *